S. M. KOHONKE.
MASTICATOR.
APPLICATION FILED JUNE 7, 1909.
937,613.
Patented Oct. 19, 1909.
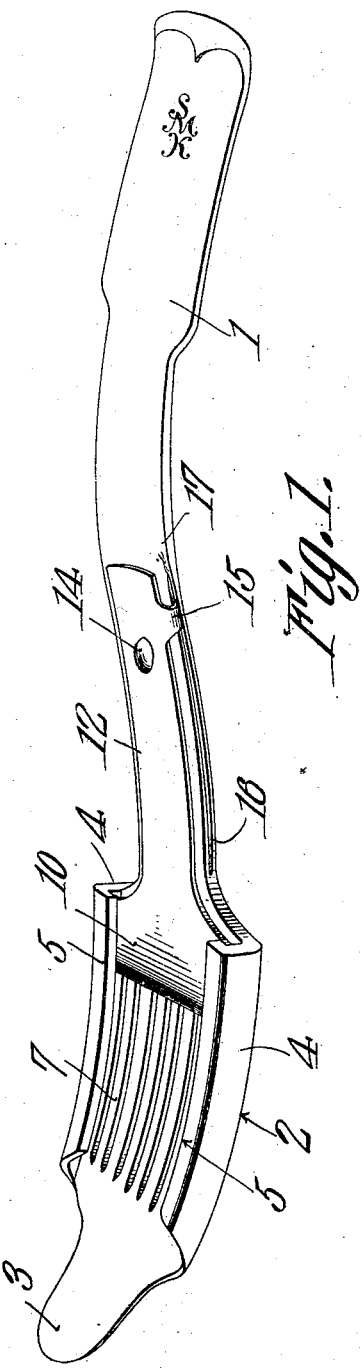
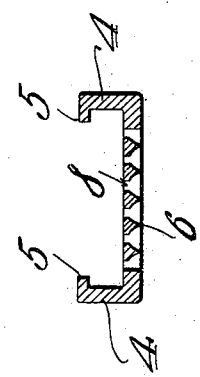
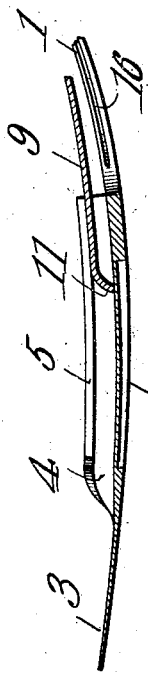
Witnesses
Inventor
Stella M. Kohonke.
By C. A. Snow & Co.
Attorneys

UNITED STATES PATENT OFFICE.

STELLA M. KOHONKE, OF NETTLETON, ARKANSAS.

MASTICATOR.

937,613.  Specification of Letters Patent.  Patented Oct. 19, 1909.

Application filed June 7, 1909. Serial No. 500,574.

*To all whom it may concern:*

Be it known that I, STELLA M. KOHONKE, a citizen of the United States, residing at Nettleton, in the county of Craighead and State of Arkansas, have invented a new and useful Masticator, of which the following is a specification.

My invention is intended to provide an implement whereby food may be severed in a clean and sanitary manner, into small particles adapted to be fed to infants, to the aged, and to the sick.

The objects of the invention are, generally, the provision in a merchantable form, of a device of the class above mentioned, which shall be inexpensive to manufacture, facile in operation, and devoid of complicated parts; specifically, the provision of a spoon-bowl of novel form and of a slide adapted to reciprocate in the bowl; and of novel means for assembling the slide with the other portions of the device; other and further objects being made manifest hereinafter as the description of the invention progresses.

The invention consists in the novel construction and arrangement of parts hereinafter described, delineated in the accompanying drawings, and particularly pointed out in that portion of this instrument wherein patentable novelty is claimed for certain distinctive and peculiar features of the device, it being understood that, within the scope of what hereinafter is thus claimed, divers changes in the form, proportions, size and minor details of the structure may be made without departing from the spirit or sacrificing any of the advantages of the invention.

Similar numerals of reference are employed to denote corresponding parts throughout the several figures of the drawings.

In the accompanying drawings, Figure 1 shows my invention in perspective; Fig. 2 is a longitudinal section of the bowl and a portion of the shank; and Fig. 3 is a transverse section of the bowl.

The improved device forming the subject matter of this application, resembles, in its general structure, a spoon. The shank 1 corresponds to the handle of the spoon and this shank 1 terminates in a bowl 2. The bowl 2 is longitudinally curved from end to end, and terminates in a resilient tip 3. The bowl is provided with up-standing sides 4, the upper edges of which are in-bent as denoted by the numeral 5, to overhang the bottom of the bowl. The bottom of the bowl is provided with a series of longitudinally disposed blades, the cutting edges of which constitute the bottom of the bowl, the backs 7 of the blades forming, as shown in Fig. 1, the upper face of the bowl 2. The blades 6 are spaced apart laterally, so that openings 8 are formed in the body of the bowl.

I further provide in carrying out my invention, a slide which is denoted by the numeral 9. This slide 9 comprises a head 10 which is adapted to reciprocate longitudinally of the bowl 2, beneath the over-bent portions 5 of the upstanding sides. The end of this head 10 is down-bent as denoted by the numeral 11, to scrape the upper surface of the bowl 2. Projecting from the head 10 is the neck portion of the slide which extends upon the shank 1. This neck 12 may be provided adjacent its end, with a hollow button 14 adapted to be engaged by the first finger of the operator to reciprocate the slide in the bowl 2. At its sides, near the end of the slide which extends upon the shank 1, the said slide is provided with inbent ears 15 which are adapted to reciprocate in grooves 16 extending longitudinally of the edges of the shank 1. As denoted by the numeral 17, the grooves are open at one end so that the ears 15 may pass outward therethrough, whereby the slide may be freed from the device in order that the same may be kept in a clean and sanitary condition.

The operation of the device will be obvious from an inspection of the drawings, but it may be stated, that, when the slide is in a retracted position as shown in Fig. 1, the bowl 2 may be pressed downward upon meat or other substance which is superposed upon a plate. The bowl 2 may then be reciprocated, and, owing to the longitudinal curvature of the bottom, if desired, rocked endwise, whereby the cutting edges of the blades will sever the food into small particles, which under the pressure of the cutting operation, will move upward through the openings 8, ultimately finding lodgment upon the upper face of the bowl 2, between the upstanding sides 4. When a sufficient quantity of the finely severed food has been collected between the upstanding sides 4, the finger of the operator may be applied to the button 14, whereby the slide 9 may be pushed forward in the bowl 2 between the upstanding sides. This operation will force the food which has collected in the bowl, outward upon the resilient tip 3, which owing to its peculiar form, is adapted to be inserted readily into the mouth of the infant. The overbent extremity 11 of the slide is well adapted to sweep clean, the upper surface of the bowl, and to deposit the food upon the tip 3. This tip 3 which is relatively thin, and yielding in construction, may be used to scrape from a plate, any finely divided particles of food which do not need to be treated by the blades 6.

The shank 1 is so constructed and disposed relative to the portions 4 and 5 of the sides of the bowl that the slide 9 will freely reciprocate from one position to another, and in the operation of the device only one hand need be employed, the other hand being free to hold the infant which is being fed.

Having thus described my said invention, what I claim as new and desire to protect by Letters Patent is:

1. A device of the class described comprising a shank terminating in a bowl having its sides overbent; blades located in the bottom of the bowl and laterally spaced to form openings therethrough; and a slide to reciprocate in the bowl beneath the overbent portion of the sides, the extremity of the slide being downbent to sweep the backs of the blades.

2. A device of the class described comprising a shank terminating in a bowl; blades located in the bottom of the bowl and laterally spaced to form openings therethrough; and a slide to reciprocate in the bowl.

3. A device of the class described comprising a shank terminating in a bowl having upstanding sides; blades located in the bottom of the bowl and laterally spaced to form openings therethrough; and a slide to reciprocate in the bowl and arranged to engage the upstanding sides.

4. A device of the class described comprising a shank terminating in a bowl; blades located in the bottom of the bowl and laterally spaced to form openings therethrough; and a slide to reciprocate in the bowl and arranged to extend upon and to engage the shank.

5. A device of the class described comprising a shank terminating in a bowl having its sides over-bent; blades located in the bottom of the bowl and laterally spaced to form openings therethrough; and a slide to reciprocate in the bowl beneath the overbent portions of the sides.

6. A device of the class described comprising a longitudinally grooved shank terminating in a bowl having its sides overbent; blades located in the bottom of the bowl and laterally spaced to form openings through the bottom of the bowl; and a slide to reciprocate in the bowl beneath the overbent portions of the sides, the slide being arranged to engage the groove of the shank in sliding relation.

7. A device of the class described comprising a longitudinally grooved shank terminating in a bowl; blades located in the bottom of the bowl and laterally spaced to form openings therethrough; and a slide to reciprocate in the bowl, said slide being provided with an ear to engage the groove of the shank, the groove being open at one end to allow the passage of the ear, to free the slide from the device.

In testimony that I claim the foregoing as my own, I have hereto affixed my signature in the presence of two witnesses.

STELLA M. KOHONKE.

Witnesses:
O. H. BROOKS,
W. A. GRADY.